US011567026B2

(12) United States Patent
Summerfelt et al.

(10) Patent No.: US 11,567,026 B2
(45) Date of Patent: Jan. 31, 2023

(54) PH SENSOR

(71) Applicant: Texas Instruments Incorporated, Dallas, TX (US)

(72) Inventors: Scott Robert Summerfelt, Garland, TX (US); Ernst Georg Muellner, Munich (DE); Sebastian Meier, Munich (DE); Markus Hefele, Munich (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/105,142

(22) Filed: Nov. 25, 2020

(65) Prior Publication Data

US 2021/0372960 A1    Dec. 2, 2021

Related U.S. Application Data

(60) Provisional application No. 63/030,062, filed on May 26, 2020.

(51) Int. Cl.
*G01N 27/22* (2006.01)
*G01N 27/416* (2006.01)

(52) U.S. Cl.
CPC ......... *G01N 27/221* (2013.01); *G01N 27/227* (2013.01); *G01N 27/4167* (2013.01)

(58) Field of Classification Search
CPC .............. G01N 27/221; G01N 27/227; G01N 27/4167; G01N 27/414
See application file for complete search history.

(56) References Cited

U.S. PATENT DOCUMENTS

| 2004/0129984 A1* | 7/2004 | Chou .................. G01N 27/414 257/387 |
| 2007/0155037 A1 | 7/2007 | Chou et al. |
| 2011/0156177 A1 | 6/2011 | Merz |
| 2017/0173969 A1* | 6/2017 | Ge ...................... B41J 2/04566 |
| 2020/0041447 A1 | 2/2020 | Chang et al. |

OTHER PUBLICATIONS

Abdulwahab et al., "A CMOS Bio-Chip combining pH Sensing, Temperature Regulation and Electric Field Generation for DNA Detection and Manipulation" IEEE, 2018, 5 pages.
Cacho-Soblechero et al., "A programmable, highly linear and PVT-insensitive ISFET array for PoC diagnosis" IEEE 2019, 5 pages.
Zeng et al., "A reference-less semiconductor ion sensor", Sensors and Actuators B: Chemical 254, Elsevier B.V., 2018, 8 pages.

* cited by examiner

*Primary Examiner* — Feba Pothen
(74) *Attorney, Agent, or Firm* — Frank D. Cimino

(57) ABSTRACT

For sensing pH of a fluid, a heating apparatus of a semiconductor die controls a temperature of the fluid to a first temperature. A first voltage of a gate of a floating gate transistor of the semiconductor die is measured while the temperature of the fluid is at the first temperature. Also, the heating apparatus controls the temperature of the fluid to a second temperature that is different than the first temperature. A second voltage of the gate is measured while the temperature of the fluid is at the second temperature. The pH of the fluid is determined based on the first and second voltages, the first temperature and the second temperature.

17 Claims, 8 Drawing Sheets

PH SENSOR

CROSS-REFERENCE TO RELATED APPLICATION

This application claims priority to, and the benefit of, U.S. Provisional Patent Application No. 63/030,062 filed May 26, 2020, the entirety of which is hereby incorporated by reference.

BACKGROUND

Sensors are useful for sensing a pH of water or other fluid (e.g., liquid). Some pH sensors use an electrolyte-insulator-semiconductor field-effect transistor (ISFET) and a chemical reference, such as silver (Ag)/silver chloride (AgCl). These sensors use a reference electrode positioned within the sensed fluid to obtain an electrical measurement that can be used to characterize the pH of the sensed fluid. However, the reference is complicated and costly to manufacture. Moreover, the reference contains liquids, such as a silver wire coated with AgCl and suspended in a solution that includes potassium chloride (KCl)+AgCl with a glass frit between reference and sensed fluid. Using a more simplified and cost-effective reference, such as platinum (Pt), gold (Au), iridium oxide ($IrO_x$), ruthenium oxide ($RuO_2$), etc. is problematic because the voltage between the electrode and fluid will drift erratically with time.

SUMMARY

In one aspect, a sensor includes a semiconductor die, a transistor, a first electrode, a second electrode, a third electrode, a metal resistor, and a heater circuit. The semiconductor die has a sensing side, a semiconductor substrate, a metallization structure, and a dielectric layer. The metallization structure includes a first level on the semiconductor substrate, and a second level between the first level and the sensing side. The dielectric layer is positioned between the sensing side and the second level. The first electrode has a first surface exposed through a first opening in the dielectric layer to be coupled to the fluid. The second electrode has a second surface exposed through a second opening in the dielectric layer to be coupled to the fluid. The third electrode is coupled to the transistor gate and is separated by the dielectric layer from the sensing side to form a capacitor between the fluid and the gate. The heater circuit has an output coupled to the metal resistor and the heater circuit is configured to deliver a current signal to the metal resistor to selectively heat the fluid.

In another aspect, a sensor includes a semiconductor die, a transistor, a heating apparatus, a fluid potential sense circuit, and a controller. The semiconductor die has a sensing side, a semiconductor substrate, a metallization structure, and a dielectric layer. The metallization structure includes a first electrode, a second electrode, and a third electrode. The first electrode has a first surface exposed through a first opening in the dielectric layer. The second electrode has a second surface exposed through a second opening in the dielectric layer. The third electrode is spaced from the first and second electrodes and separated by the dielectric layer from the sensing side. The transistor has a gate, a drain, and a source. The gate is coupled to the third electrode to sense a potential of the fluid through a capacitor formed by the dielectric layer between the fluid and the third electrode. The heating apparatus has a metal resistor in the metallization structure, and a heater circuit in the semiconductor die. The heater circuit has an output coupled to the metal resistor and the heater circuit is configured to deliver a current signal to the metal resistor to selectively heat the fluid. The fluid potential sense circuit is coupled to the transistor to provide an output signal representing a potential of the fluid. The controller is configured to control the heater circuit to control a temperature of the fluid to a first temperature, receive a first sample of the output signal from the fluid potential sense circuit while the temperature of the fluid is at the first temperature, control the heater circuit to control the temperature of the fluid to a second temperature that is different than the first temperature, receive a second sample of the output signal from the fluid potential sense circuit while the temperature of the fluid is at the second temperature, and provide a pH signal that represents a pH of the fluid based on the first and second samples of the output signal, the first temperature, and the second temperature.

In a further aspect, a method comprises controlling a temperature of a fluid to a first temperature using a heating apparatus of a semiconductor die, and measuring a first voltage of a gate of a floating gate transistor of the semiconductor die while the temperature of the fluid is at the first temperature. The method further comprises controlling the temperature of the fluid to a second temperature that is different than the first temperature using the heating apparatus of the semiconductor die, measuring a second voltage of the gate of the floating gate transistor while the temperature of the fluid is at the second temperature, and determining a pH of the fluid based on the first and second voltages of the gate, the first temperature, and the second temperature.

DETAILED DESCRIPTION

Figure 1:
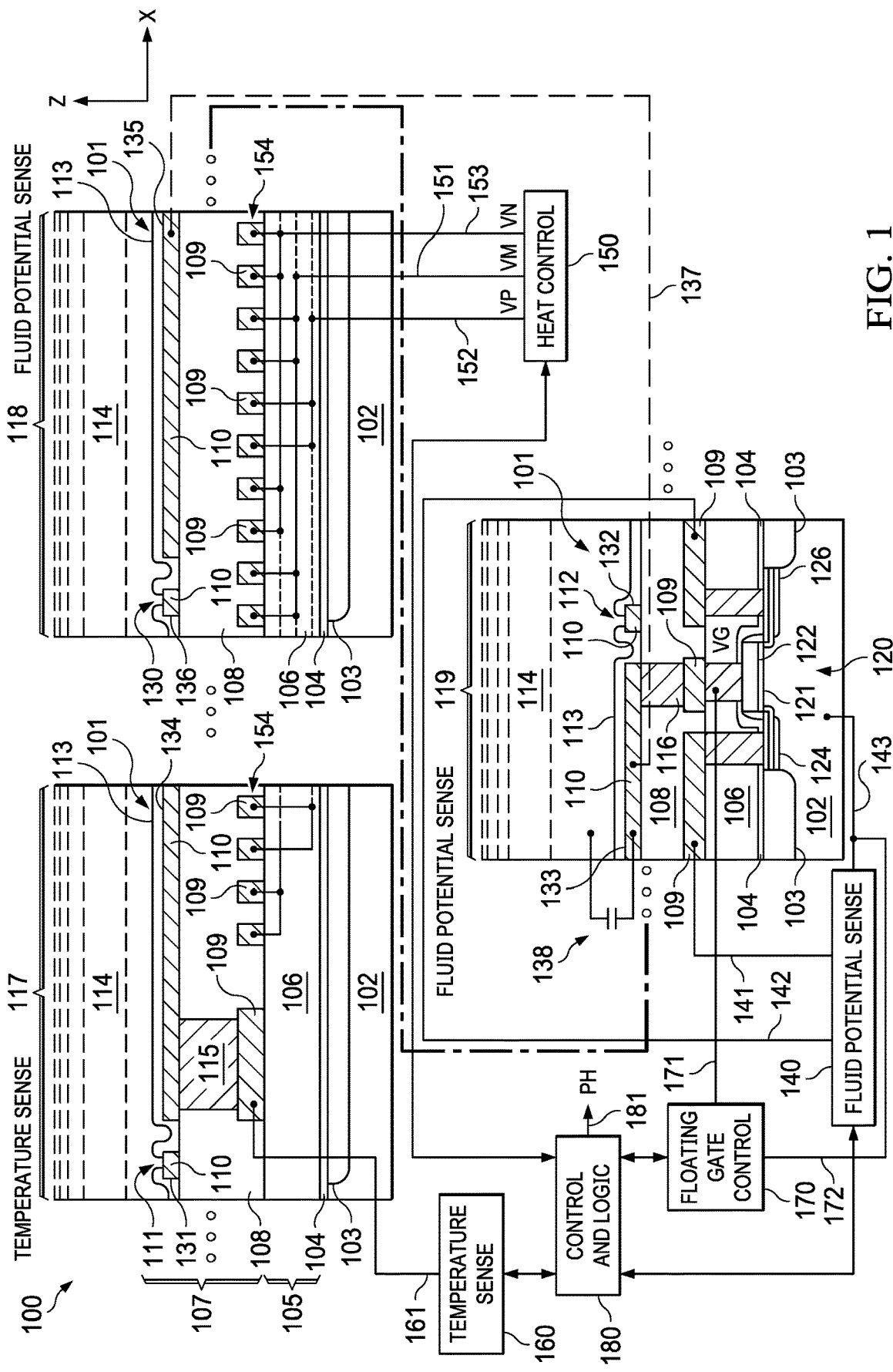
FIG. 1 is a partial sectional side elevation view and schematic drawing of a reference free pH sensor.

In the drawings, like reference numerals refer to like elements throughout, and the various features are not necessarily drawn to scale. Also, the term "couple" or "couples" includes indirect or direct electrical or mechanical connection or combinations thereof. For example, if a first device couples to or is coupled with a second device, that connection may be through a direct electrical connection, or through an indirect electrical connection via one or more intervening devices and connections. One or more operational characteristics of various circuits, systems and/or components are hereinafter described in the context of functions which in some cases result from configuration and/or interconnection of various structures when circuitry is powered and operating.

Figure 2:
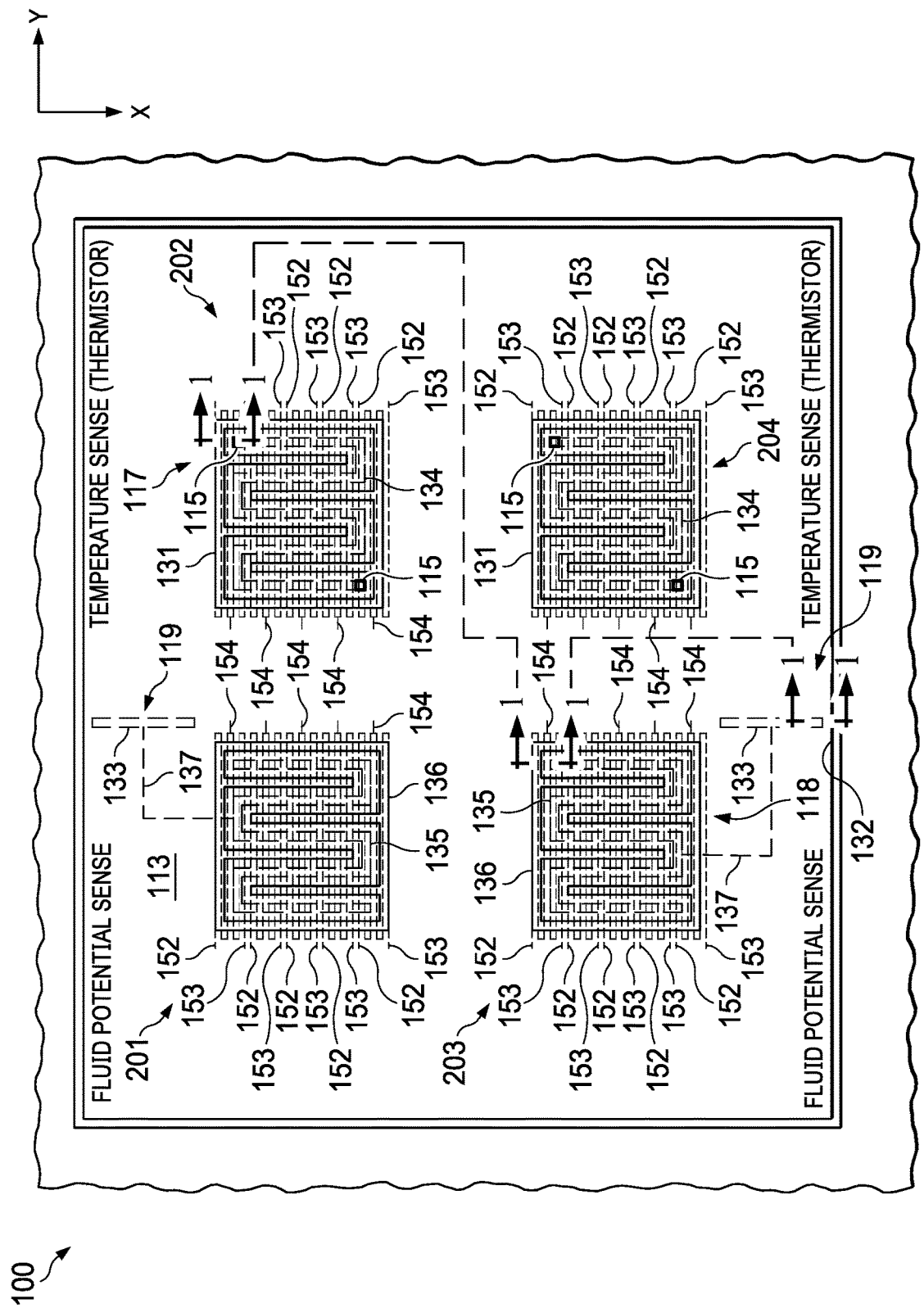
FIG. 2 is a top plan view of the pH sensor of FIG. 1.

Referring initially to FIGS. 1 and 2, FIG. 1 shows a reference free (e.g., no reference) sensor 100, including schematic circuit components and partial sectional side elevation structure views taken along line 1-1 in FIG. 2, and FIG. 2 shows a top plan view of the pH sensor of FIG. 1. The sensor 100 in one example is used to sense a pH of a fluid. The sensor 100 can be used in other applications for sensing pH or another electrical condition of a fluid. The sensor 100 includes a semiconductor die having a sensing side 101, In the illustrated example, the sensing side 101 is a generally planar sensing face on a top of the sensor 100. The sensor 100 includes a semiconductor die with a semiconductor substrate 102, for example, having a lightly doped n- or p-silicon structure, oppositely doped wells 103, and a dielectric layer 104 on a top side thereof. The semiconductor die also includes a metallization structure formed over the dielectric layer 104. The metallization structure includes a first level 105 with a pre-metal dielectric (PMD) 106 extending on the semiconductor substrate above the dielectric layer 104. The metallization stricture also includes a second level 107 disposed between the first level 105 and the sensing side 101. In another example, the metallization structure includes more than two levels. The second level 107 in FIG. 1 includes a first inter-level dielectric (ILD) layer 108, such as silicon dioxide ($SiO_2$). The illustrated example includes a single ILD level 107 with patterned features 109 formed of conductive aluminum on the top side of the underlying PMD layer 106 and covered with the ILD material 108. In other examples the metallization structure includes any integer number of levels, with conductive routing features and conductive contacts or vias to for signal routing and/or component interconnections.

A conductive patterned electrode layer 110 extends on a top side of the ILD layer 108 to form various conductive electrode features as described further below. In one example, the patterned electrode layer 110 is or includes platinum. In operation, the potential of a fluid is set by contact with one or more electrodes of the patterned electrode layer 110, and the exposed electrode or electrodes preferably are or include a non-reactive material with the fluid, for example, gold (Au), platinum (Pt), iridium (Ir), iridium oxide (IrOx), palladium (Pd), etc. The solution potential ideally is connected outside of the heater so that the voltage potential of the heating the sense electrode does not change. Certain electrodes of the patterned electrode layer 110 have exposed upper surfaces or sides, for example, shown as 111 and 112 in FIGS. 1 and 2. The remainder of the patterned electrode layer 110 and the top side of the ILD layer 108 are covered by a dielectric layer 113 that extends between the sensing side 101 and the second level 107 of the metallization structure. In one example, the dielectric layer 113 is or includes one or more materials that are stable when in direct contact with the fluid 114. Suitable examples for a water pH sensing application include tantalum pentoxide ($Ta_2O_5$), silicon nitride (SiN), aluminum oxide ($AlO_x$), zirconium oxide ($ZrO_x$), titanium oxide ($TiO_2$), silicon oxynitride (SiON), and silicon dioxide ($SiO_2$) aluminum nitride (AlN).

In use when installed in a pH sensing application, the top side or surface of the dielectric layer 113 forms an insulative barrier between the covered electrodes and a fluid 114. The sensing side 101 is coupled to a fluid 114, such as water or other liquid or gas for sensing pH or other fluid characteristic, and the sensor 100 can include packaging structures such as an enclosure (not shown) that protects the semiconductor die and allows coupling (e.g., direct exposure) of the fluid 114 to the sensing side 101 of the sensor 100.

The second level 107 of the metallization structure also includes conductive vias to form electrical connections between select features of the patterned electrode layer 110 and select patterned features 109 on the top side of the PMD layer 106. FIG. 1 shows two examples, including a via 115 that electrically interconnects an electrode feature 110 with a routing feature 109, and another via 116 that interconnects a floating gate electrode feature 110 with a transistor gate routing feature 109. The PMD layer 106 of the first level 105 includes conductive vias (e.g., tungsten (W)) that electrically interconnect select component terminals (e.g., transistor gate, drain and source) to respective patterned features 109 for routing and coupling to electrodes, other components or circuits in the semiconductor die.

FIG. 1 shows select sectional side views of three portions 117, 118 and 119 of the sensor 100, the positions of which are indicated along the corresponding section line 1-1 in the top view of FIG. 2. The portion 117 shows features and aspects of a temperature sense region of the sensor 100 (labeled "TEMPERATURE SENSE" in FIG. 1 and "TEMPERATURE SENSE" (thermistor) in FIG. 2). The portion 118 shows features and aspects of a fluid potential sense region of the sensor 100 (labeled "FLUID POTENTIAL SENSE" in FIGS. 1 and 2. The portion 119 shows features and aspects of a fluid potential sense region of the sensor 100. As further shown in FIG. 2, moreover, the example sensor 100 includes two instances of the fluid potential sense region with two portions 119, each having features generally as shown in FIG. 1 and described further below.

As best shown in FIG. 1, the fluid potential sense portion 119 of the sensor 100 includes a field effect transistor (FET) 120 having a gate dielectric 121, a gate 122 positioned over the gate dielectric 121, a drain 124, and a source 126. In this example, the drain 124 and the source 126 include multiple heavily doped implanted regions with dopants having a polarity opposite to that of the underline portion of the substrate 102. In the illustrated example, the transistor 120 is an n-channel transistor. In other examples, the transistor 120 is a p-channel transistor. In one example, the transistor 120 is an extended gate ISFET. The first level 105 of the metallization structure includes tungsten contacts that form electrical connections from the respective gate 122, drain 124 and source 126 of the transistor 122 corresponding patterned features 109 in the second level 107. In operation of the sensor 100, a gate voltage VG of the transistor gate 122 is measured for sensing the pH of the fluid 114 as described further below. As shown in FIG. 1, the portion 118 of the sensor 100 includes a patterned electrode feature 110 that has a third surface 130 exposed through a third opening in the dielectric layer 113 in order to be coupled to the fluid 114.

The metallization structure includes patterned features 110 that form various electrodes 131, 132, 133, 134, 135 and 136 used to sense the pH of the fluid 114. In the temperature sense portion 117, a first electrode 131 is spaced from the first electrode 131 in the second level 107 and includes a first surface 111 exposed through a first opening in the dielectric layer 113 to be coupled to the fluid 114.

A second electrode 132 is spaced from the first electrode 131 in the second level 107 in the fluid potential sense portion 119 shown in FIG. 1. The second electrode 132 includes a second surface 112 exposed through a second opening in the dielectric layer 113 to be coupled to the fluid 114. In the fluid potential sense portion 119, a third electrode 133 is spaced from the first and second electrodes 131, 132 in the second level 107. The third electrode 133 is coupled to the gate 122 for sensing a potential of the fluid 114. The third electrode 133 is separated by the dielectric layer 113 from the sensing side 101 to form a capacitor 138 between the fluid 114 and the gate 122. The third electrode 133 has no direct contact with the fluid 114. In this example, the fluid 114 above the third electrode 133 forms an upper capacitor plate, and the third electrode 133 forms a lower capacitor plate, and the capacitor plates are separated by the intervening dielectric material of the layer 113 to form the capacitor 138.

A fourth electrode 134 is positioned in the second level 107 in the temperature sense portion 117. The fourth electrode 134 operates as a thermistor coupled to a temperature sensing circuit by the conductive via 115 as shown in FIG. 1. The fourth electrode 134 is spaced from the first, second and third electrodes 131, 132 and 133. The fourth electrode 134 is separated by the dielectric layer 113 from the sensing side 101 and the fourth electrode 134 has no direct contact with the fluid 114.

In the portion 118, a fifth electrode 135 is spaced from the respective first, second and fourth electrodes 131, 132 and 134 in the second level 107 of the metallization structure. The fifth electrode 135 is electrically coupled to the third electrode 133, for example, by conductive interconnection routing traces and vias (not shown) in the first and second levels 105 and 107, indicated by the dashed lines 137 in FIGS. 1 and 2. The fifth electrode 135 is separated by the dielectric layer 113 from the sensing side 101 and the fifth electrode 135 has no direct contact with the fluid 114. A sixth electrode 136 is spaced from the respective first, second, third, fourth and fifth electrodes 131, 132, 133, 134 and 135 in the second level 107 in the fluid potential sense portion 118. The sixth electrode 136 has the third surface 130 that is exposed through the third opening in the dielectric layer 113 to be coupled to the fluid 114.

The sensor 100 includes a fluid potential sense circuit 140 in the semiconductor die. The fluid potential sense circuit 140 is coupled to the transistor 120 and is configured to provide an output signal that represents a potential of the fluid 114. The transistor gate 122 is coupled to the third electrode 133 to sense the potential of the fluid 114 through the capacitor 138 formed by the dielectric layer 113 between the fluid 114 and the third electrode 133. The fluid potential sense circuit 140 has a first input 141 that is coupled to the drain 124 of the transistor 120, a second input 142 that is coupled to the source 126 of the transistor 120, a third input 143 that is coupled to a body connection of the transistor 120, and an output. The output of the fluid potential sense circuit is coupled to a controller as described further below, and the output is configured to provide an output signal that represents a potential of the fluid 114.

The sensor 100 includes a heating apparatus having a heater circuit 150 with outputs 151, 152 and 153 in the semiconductor die. The heating apparatus also includes a metal resistor 154 in the second level 107 of the metallization structure. The outputs 151, 152 and 153 of the heater circuit 150 are coupled to the metal resistor 154. The heater circuit 150 is configured to deliver a current signal to the metal resistor 154 to selectively indirectly heat the fluid 114. The metal resistor 154 is formed in one example by interconnected aluminum heating fin structures 109 that extends in the respective temperature sense and fluid potential sense portions 117 and 118 of the second level 107 of the metallization structure. The metal resistor features are spaced from, but extend beneath and proximate to, portions of the electrodes 131, 134, 135 and 136 in the second level 107 of the metallization structure.

As further shown and described below in connection with FIG. 6, the heater circuit 150 includes a first output 151 coupled to taps of respective longitudinal sections of the metal resistor 154. The second output 152 of the heater circuit 150 is coupled to first ends of the respective longitudinal sections of the metal resistor 154, and the third output 153 is coupled to second ends of the respective longitudinal sections of the metal resistor 154. In this example, the second output 152 of the heater circuit 150 is configured to provide a first voltage signal VP that is positive relative to a voltage VM of the first output 151 of the heater circuit 150. In addition, the third output 153 of the heater circuit 150 is configured to provide a second voltage signal VN that is negative relative to the voltage VM of the first output 151. The positioning of the metal resistor 154 proximate to the sensing side 101 allows the heater circuit 150 to control the temperature of the fluid 114, particularly near the sensing side 101. The temperature control in turn, allows accurate assessment of the pH of the fluid 114 by measuring and sampling the gate voltage VG of the floating gate 122 while the fluid temperature is at different temperatures.

The sensor 100 has a temperature sense apparatus that includes the fourth electrode 134 operating as a thermistor, and a temperature sense circuit 160. The temperature sense circuit 160 includes an input 161 that is coupled to the fourth electrode 134 through a conductor (e.g., aluminum) routing feature 109 and the conductive via 115 in the temperature sense portion 117 of the sensor 100 as shown in FIG. 1. The heating (e.g., temperature rise) in one example is very local, both in the fluid 114 and in the semiconductor die. In one implementation, the heater/temperature sensor combination determines either the temperature rise for a given control signal or determines the required control signal to achieve a target temperature rise. The fluid potential sense circuit 140 uses this information to get the different potentials with and without heating in one example. In one example, moreover, the heating occurs in short pulses to mitigate or avoid permanent heat up of the chip and the fluid 114 and reduce the power consumption. In one example, the heater default state has the transfer gate closed with the heater off. In one example, the sensor implements two phases, including a first phase that employs the temperature sensor to determine a ΔT or heater control value (heater on vs heater off), and a second phase to sense the fluid potential with the transfer gates open, and the sensor computes the fluid pH according to the two potential samples and the temperature changes. In operation, the temperature sense circuit 160 senses a resistance of the fourth electrode 134 to determine the temperature of the fourth electrode 134. In one example, the temperature sense circuit 160 includes a current source that selectively applies a predetermined current to one end of the fourth electrode 134 and senses a voltage between first and second ends of the fourth electrode 134 to determine the electrode resistance. In this example, the temperature sense circuit 160 includes voltage sense circuitry, and provides an output voltage signal that can be correlated to the temperature of the fourth electrode 134. Due to the proximity of the fourth electrode 134 to the fluid 114, the output voltage signal is representative of the temperature of the fluid 114.

In one implementation, the output voltage signal from the temperature sense circuit 160 is provided to a controller that verifies the fluid temperature in order to control timing of sampling of an output of the fluid potential sense circuit 140 in order to sample the fluid potential sense output at two or more known temperatures. In another implementation, the output voltage signal from the temperature sense circuit 160 is provided as a temperature feedback signal to the controller, and the controller modifies operation of the heater circuit 150 to regulate the temperature of the fourth electrode 134 and closed loop fashion.

The sensor 100 in one example also includes a gate control circuit 170 (labeled "FLOATING GATE CONTROL" in FIG. 1. The gate control circuit 170 includes an output 171 coupled to the gate 122, and the gate control circuit 170 is configured to provide an adjustment signal to the gate 122. In one example, the gate control circuit 170 also includes an output 172 coupled to a body connection of the transistor 120 is shown in FIG. 1. In operation, the gate control circuit 170 is used in certain examples to reset or stabilize the gate voltage VG of the transistor gate 122 before or after fluid potential sense measurements. Example implementations of the gate control circuit 170 are illustrated and described further below in connection with FIGS. 9 and 10.

The sensor 100 further includes a controller 180 in the semiconductor die. The controller 180 is operatively coupled by electrical connections to the fluid potential sense circuit 140, the heater circuit 150, the temperature sense circuit 160, and the gate control circuit 170. The controller 180 in one example includes logic circuitry, for example, to implement a state machine or perform other logic operations to send control signals to, and receive digital signals from, the circuits 140, 150, 160 and/or 170. The controller 180 in one example also includes one or more analog interface circuits, such as buffers, amplifiers, analog-to-digital converters, etc. The controller 180 is configured by logic circuit configuration and/or programming to perform various operations and functions as described further below. In one implementation, the controller 180 controls and/or interfaces with the circuits 140, 150, 160 and/or 170 to continuously sense the pH of the fluid 114 by repeating a sequence of floating gate voltage measurements at different temperatures. The controller 180 in this implementation provides a pH signal (labeled "PH" in FIG. 1) at an output 181.

The sensor 100 is shown from the side view in FIG. 1 with a first lateral direction X and a vertical direction Z. FIG. 2 shows a top view of one example of the pH sensor 100 in a plane of first and second lateral directions X and Y. The downward facing top view of FIG. 2 shows the sensing side including the top surface of the dielectric layer 113 and the electrode surfaces of the electrodes 131, 132 and 136 exposed through the respective first, second and third openings in the dielectric layer 113. FIG. 2 also shows underlying features and structures in dashed lines, which are covered by the dielectric layer 113. These dashed-line structures in FIG. 2 include the third electrode 133, the fourth electrode 134 in the regions 202 and 204, and the fifth electrode 135 in the regions 201 and 203, as well as the patterned aluminum features 109, with numerically designated connections to the outputs 151, 152 and 153 of the heater circuit 150.

The sensor implementation in FIG. 2 includes four generally square inner regions 201, 202, 203 and 204 laterally surrounded by the second electrode 132. In this example, the region 203 is a second instance of the region 201, and the region 204 is a second instance of the region 202. Other implementations include arrangements of four such regions or a different number of regions. Although the regions 201-204 are generally square, other shapes can be used in different examples. In this example, the respective first and fourth electrodes 131 and 134 are in a first region 201 (and in the third region 203) in the second level 107. In addition, the fifth and sixth electrodes 135, 136 are in the second region 202 (and the region 201) in the second level 107 of the metallization structure. The regions 201-204 are all spaced from one another as shown in FIG. 2, where the second region 202 is spaced from the first region 201. The second electrode 132 laterally surrounds the regions 201-204, and has a generally rectangular shape, although not a strict requirement of all possible implementations.

The respective first and sixth electrodes 131 and 136 in this example have outer rectangular structures that surround the respective fifth and fourth electrodes 135 and 136. For example, the first electrode 131 laterally surrounds the fourth electrode 134 in the second metallization level 107 of the second and fourth regions 202 and 204. Similarly, the sixth electrode 136 laterally surrounds the fifth electrode 135 in the second level 107 of the regions 201 and 203. In addition, the respective fourth and fifth electrodes 134 and 135 have serpentine shapes with elongated sections that extend along the first direction X. The first and sixth electrodes 131 and 136 have oppositely disposed, inwardly extending branch portions that extend along the first direction X between branches of the respective serpentine shaped electrodes 134 and 135. For example, the first electrode 131 has inwardly extending branch portions that extend along the first direction X between adjacent ones of the elongated sections of the fourth electrode 134 in the regions 202 and 204, and the sixth electrode 136 has inwardly extending branch portions that extend along the first direction X between adjacent ones of the elongated sections of the first electrode 131 in the regions 201 and 203. As shown in FIG. 2, certain implementations include two or more instances of the fluid potential sense portions 119, each having a floating gate transistor 120 and associated circuitry as described above in connection with FIG. 1. The encircling electrodes 131 and 136 are substantially equally spaced from the respective encircled serpentine electrodes 134 and 135. In other examples, the electrodes are spaced by different amounts. The electrodes 131, 134, 135 and 136 in FIGS. 1 and 2 are generally of equal lateral widths. In other examples, the electrodes 131 and 134-136 have different widths.

Figure 3:
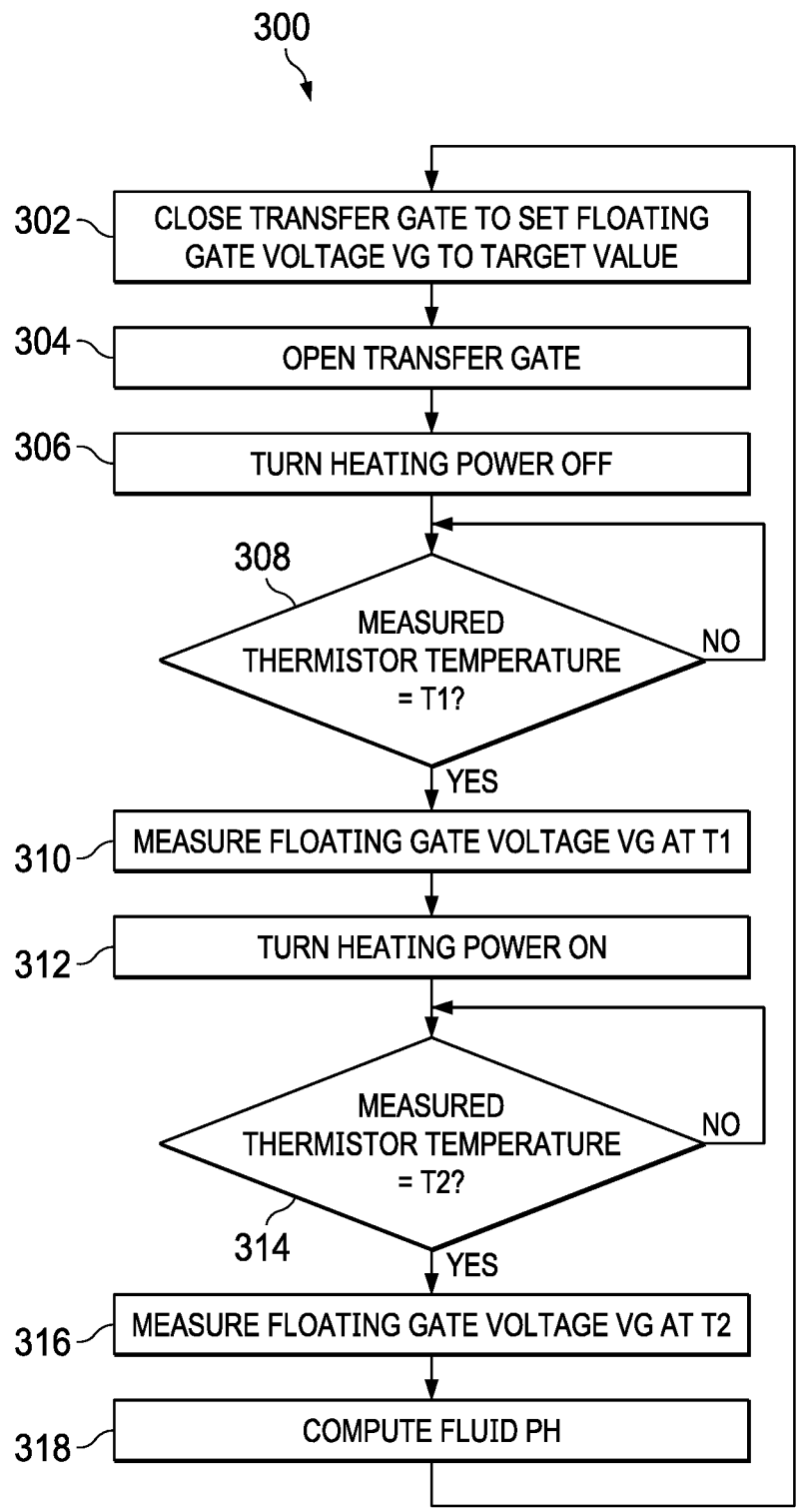
FIG. 3 is a flow diagram of a method of sensing pH using the pH sensor of FIGS. 1 and 2.

FIG. 3 is a flow diagram that shows a method 300 for sensing pH using the sensor 100 of FIGS. 1 and 2. The controller 180 in one example is configured to perform the method 300 using one or more of the circuits 140, 150, 160 and/or 170 in FIG. 1. With the sensing side 101 of the semiconductor die 102, 105, 107 coupled to the fluid 114 as shown in FIG. 1, the controller 180 implements the method 300 in one or more measurement cycles, one of which is shown in FIG. 3. In one implementation, the method 300 includes setting or adjusting the floating gate voltage at 302 and 304 VG before or after measuring the voltage VG of the gate 122. In the example of FIG. 3, the controller 302 sets the gate voltage VG to a target value at 302 using the gate control circuit 170. In one example, the controller 180 causes the gate control circuit to close a transfer gate at 302 (e.g., described further below in connection with FIG. 10) to temporarily couple the transistor gate 122 to a voltage reference in order to set the gate voltage VG to a target level. The controller 180 in this example then opens the transfer gate at 304, leaving the transistor gate 122 electrically floating.

The controller 180 then implements a sequence of two floating gate voltage measurements at two respective temperatures and computes the pH of the fluid based on the two temperatures and the respective gate voltage measurements.

At 306 in one example, the controller 180 uses the heating apparatus (e.g., the heater circuit 150) control the temperature of the fluid 114 to a first temperature T1. In one example, this includes setting the fluid temperature to T1, for example, by turning the heating power off. In another implementation, the controller 180 controls application of power by the heater circuit 150 to a non-zero level to set the temperature of the fluid 114 to the first temperature T1. At 308 in FIG. 3, the controller 180 in one example uses the temperature sense circuit 160 to verify whether the temperature of the fluid 114 is at or near the desired first temperature T1. In this example, if the temperature is not within a predetermined acceptable range around T1 (NO at 308), the controller 180 continues monitoring the measured temperature at 308.

Once the temperature is within the acceptable range of the first temperature T1 (YES at 308), the controller 180 uses the fluid potential sense circuit 140 to measure the floating gate voltage VG at 310. In one example, the controller 180 receives a first sample of the output signal from the fluid potential sense circuit 140 while the temperature of the fluid 114 is at T1. In one example, this includes measuring a first voltage VG of the gate 122 while the temperature of the fluid 114 is at the first temperature T1. In one implementation, the gate voltage is directly sensed, for example, using a buffer amplifier circuit. In another example, the fluid potential sense circuit 140 provides a current signal through the channel of the transistor 120 and measures a resulting drain-source voltage between the transistor drain 124 and source 126 to determine the drain-source impedance, and computes the corresponding floating gate voltage VG based on the sensed drain-source impedance.

In one example, the controller 180 causes the heater circuit 150 to then control the temperature of the fluid 114 to a second temperature T2. In one implementation, this includes causing the heater circuit 150 to turn the heating power on at 312 and determining at 314 whether the measured thermistor temperature is equal to a different second temperature T2 using the temperature sense circuit 160. The controller 180 in one example uses the temperature sense circuit 160 to verify whether the temperature of the fluid 114 is at or near the desired second temperature T2 at 314. In this example, if the temperature is not within a predetermined acceptable range around T1 (NO at 314), the controller 180 continues monitoring the measured temperature at 314. When the temperature is within an acceptance range of T2 (YES at 314), the controller 180 uses the fluid potential sense circuit 140 to measure a second gate voltage VG at 316 while the temperature of the fluid 114 is at the second temperature T2.

At 318, the controller computes the pH of the fluid 114 based on the first and second voltages VG of the gate 122, the first temperature T1, and the second temperature T2. Thereafter, the method 300 returns to 302 and the controller 180 repeats the method 300 for a next measurement cycle. In one implementation, the controller 180 operates generally continuously to repeat the method 300. In another implementation, the controller 180 implements a measurement cycle as shown in FIG. 3 on demand, for example, in response to a request signal from a host circuit (not shown). The controller 180 in one example provides an output signal PH at the output 181 in FIG. 1, where the output signal PH in one example is an analog voltage or current signal with an amplitude that represents the pH of the fluid 114. In another implementation, the output signal PH is a digital value that represents the pH of the fluid 114. In one example, the sensor 100 includes a display or other user interface (not shown) that provides a continuous readout of pH values, which are updated on demand or continuously with the most recent pH value computed at 318.

In operation in one example, the controller 180 includes computational circuitry (e.g., preprogrammed or configured or programmable logic an arithmetic logic unit (ALU), or combinations thereof) to compute the pH of the fluid 114. The sensor 100 includes the on-die heating apparatus below the sensing third electrode 134 that is coupled to the transistor gate 122 to change the local temperature of fluid 114 at the sense dielectric interface of the dielectric layer 113 along a portion of the sensing side 101. By measuring the transistor voltages for the same fluid 114 at two different temperatures, the controller 180 calculates or computes the pH based on the two temperatures T1 and T2 and the respective first and second gate voltages VG using the Nernst equation. The Nernst equation relates reduction potential to standard electrode potential, temperature & concentrations, where a cell potential $Ecell=E0cell-R*T*LN(X_{H+}/X0_{H+})/F$, where X is concentration, and X0 is a reference concentration which does not vary with $X_{H+}$. As a result, the controller 180 in one example computes the fluid pH according to the following equation $pH=LOG(X_{H+})=LOG(e)*LN(X_{H+})$ and provides the output signal (e.g., an analog voltage or current or a digital value) at the output 181 according to the computed pH. Certain implementations of the sensor 100 provide a pH sensing solution that does not require a costly and complicated reference and the sensor 100 measures the solution potential using an extended gate ISFET or other transistor 120 at two temperatures. In one implementation, the time between samples is short, for example, allowing for transition between the two temperatures. In one example, the sensor 100 uses platinum (Pt) electrodes 131-136 as a reference for sensing the fluid potential, with the floating gate 122 capacitively coupled by the capacitor 144 and the dielectric layer 113. In the illustrated examples, moreover, the potential of the fluid 114 is sensed by the encircling first and sixth electrodes 131 and 136 being exposed to the fluid 114 through the corresponding openings in the dielectric layer 113.

In the above example, the controller 180 operates the heater circuit 150 to control the temperature of the fluid 114 to first and second predetermined temperature values T1 and T2. In the illustrated example, the controller 180 also uses the temperature sense circuit 160 and the thermistor implemented by the fourth electrode 134 in order to verify when the sensed temperature reaches the desired value and/or to provide a temperature feedback signal for closed loop control using the heater circuit 150 in order to control the sensed fluid temperature to the desired value T1 or T2.

In another possible implementation, the first and second temperatures are not predetermined, and the controller 180 uses the temperature feedback from the temperature sense circuit 160 in combination with changing control of the heater circuit 150 in order to measure first and second gate voltage values VG at two different temperatures. In this implementation, the feedback from the temperature sense circuit 160 is used to ascertain the actual values of the different temperatures T1 and T2 for a given measurement cycle, and these values are used with the respective first and second gate voltage values VG to compute the fluid pH at 318. The controller 180 in one example provides the signal PH at the output 181 that represents the pH of the fluid 114 based on the first and second samples of the output signal from the fluid potential sense circuit 140, the first temperature T1, and the second temperature T2.

In certain implementations, the controller 180 stabilizes or sets the gate voltage VG of the floating gate transistor 120 between measurement cycles using the gate control circuit 170, and each measurement cycle includes measurements at two or more different temperatures, for example, at the beginning of each pH measurement cycle. In another example, the controller 180 uses the gate control circuit 170 to set or adjust the gate voltage VG at the end of a given pH measurement cycle. In another possible implementation, the controller 180 uses the gate control circuit 170 to set or adjust the gate voltage VG at a different interval, for example, after every integer number N pH measurement cycles.

In some implementations, moreover, the controller 180 uses sensed fluid temperature signals or information from the temperature sense circuit 160 in order to provide closed loop control and/or verification of the fluid temperature via of the heater circuit 150 during individual measurement cycles. In this regard, the controller 180 in certain examples determines that the fluid temperature is at the desired value when the feedback from the temperature sense circuit 160 is within a certain non-zero tolerance range that includes the desired value.

In the illustrated example, the controller 180 implements on or off temperature control by controlling the heater circuit 150 in a first mode (e.g., 306 in FIG. 3) to refrain from delivering the current signal to the metal resistor 154 (no heating power applied), and to receive the output signal from the fluid potential sense circuit 140 while the heater circuit 150 refrains from delivering the current signal to the metal resistor 154. In a second mode (e.g., 312 in FIG. 3), the controller 180 controls the heater circuit 150 to deliver the current signal to the metal resistor 154, and receives receive the output signal from the fluid potential sense circuit 140 while the heater circuit 150 delivers the current signal to the metal resistor 154. In other implementations, the heater circuit implements a different heating control technique, such as by applying a current signal of two different amplitudes to achieve two different fluid temperatures, using pulse width modulation of the current signal to achieve two different fluid temperatures, etc., whether using open loop control with temperature verification (e.g., 308 and 314 in FIG. 3) before sampling or using closed loop control by the controller 180. In one example, the controller 180 receives the temperature feedback signal from the temperature sense circuit 160 in at least one of the first or second modes, and performs one of the following: (a) control an amplitude or timing of the current signal to the metal resistor 154 based on the temperature feedback signal; (b) control sampling of the output signal or sampling of the second output signal from the fluid potential sense circuit 140 based on the temperature feedback signal; or (c) provide the pH signal based on the output signal, the second output signal from the fluid potential sense circuit 140, and the temperature feedback signal.

In certain implementations, moreover, the controller 180 computes the pH of the fluid 114 based on sensed fluid potential signal samples obtained at two or more different temperatures and based on the different temperature values. For example, the controller 180 in another implementation sets or controls the fluid temperature to three or more different temperature values and measures first, second and third (or more) respective gate voltage values VG, and uses the three or more different temperature values and corresponding gate voltage values to compute the fluid pH at 318.

In this manner, sensor 100 senses the pH of the fluid 114 without needing an external reference in the fluid 114. This advantageously reduces cost and complexity compared with pH sensors that use external references. The selective use of the gate control circuit 170 in certain examples facilitates fluid potential stability over time by counteracting drift and other effects.

Figure 4:
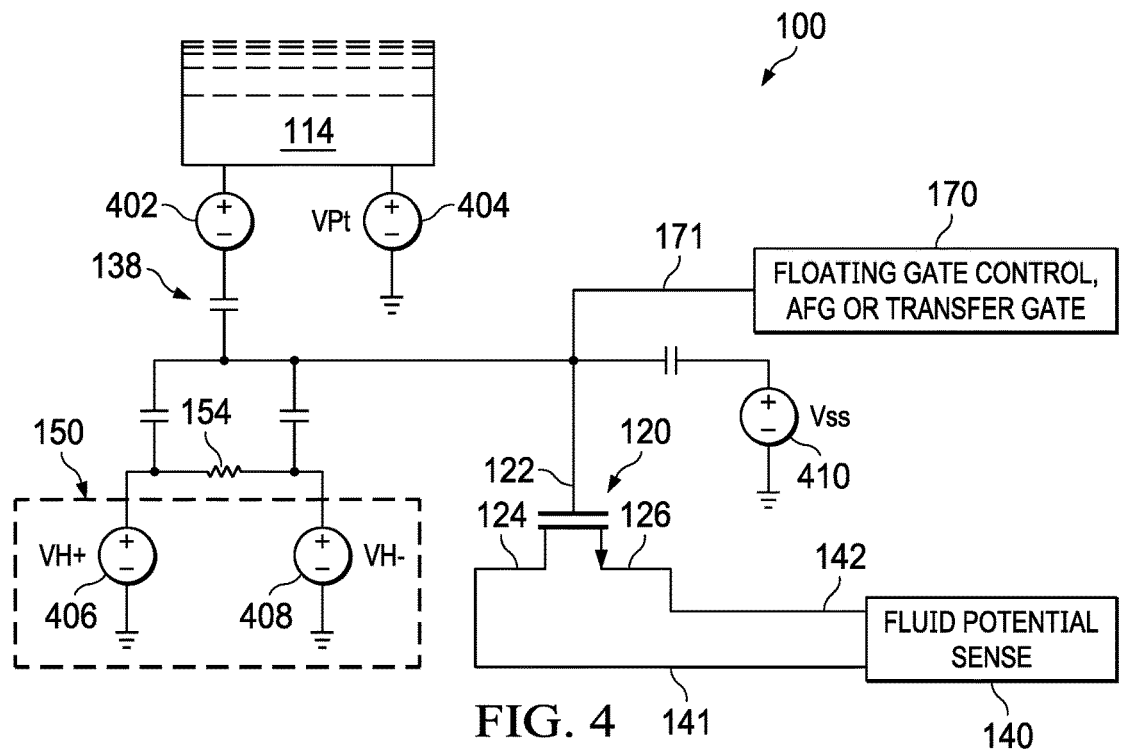
FIG. 4 is a schematic diagram of capacitive couplings in the pH sensor of FIGS. 1 and 2.

FIG. 4 shows a schematic representation of the capacitive couplings in the pH sensor of FIGS. 1 and 2. As schematically represented, the fluid potential sensing capacitor 144 is larger than the other capacitive couplings to the floating gate 122 of the transistor 120. The sensing capacitor 144 provides capacitive coupling between the floating gate 122 and the fluid potential, represented in FIG. 4 is a voltage source 402. The fluid 114 is held at the potential of the exposed electrodes 131 and 136 by direct connection through the corresponding openings in the dielectric layer 113, and this is represented in FIG. 4 as an electrode voltage source 404 (e.g., a voltage VPt of the platinum electrodes 131 and 136). In one implementation, the heater circuit 150 provides a positive first heater voltage VH+ to one end of the metal resistor 154 (represented as a first voltage source 406 in FIG. 4), and provides a negative second heater voltage VH− to the other end of the metal resistor 154 (represented as a second voltage source 408). These voltages are capacitively coupled by small capacitors to the floating gate 122 of the transistor 120.

As further shown in FIG. 4, another small capacitor represents parasitic capacitance of the semiconductor die that couples a voltage Vss to the floating gate 122 (represented as a further voltage source 410). The sensor construction in one example mitigates or prevents heater capacitance coupling to the floating gate 122. The metal resistor 154 in the illustrated example is positioned just below the platinum/fluid sensing capacitor 144 with large coupling capacitance. In one implementation, the heater circuit 150 provides the voltage steps (VH+, VH−) to the metal resistor 154 in the range of volts, while the detected signals are in the range of mV. As described further below in connection with FIG. 6, the heater circuit 150 in one example advantageously applies symmetrical voltage steps VH+ and VH− to deliver a current signal to the metal resistor 154 during heating.

Figure 5:
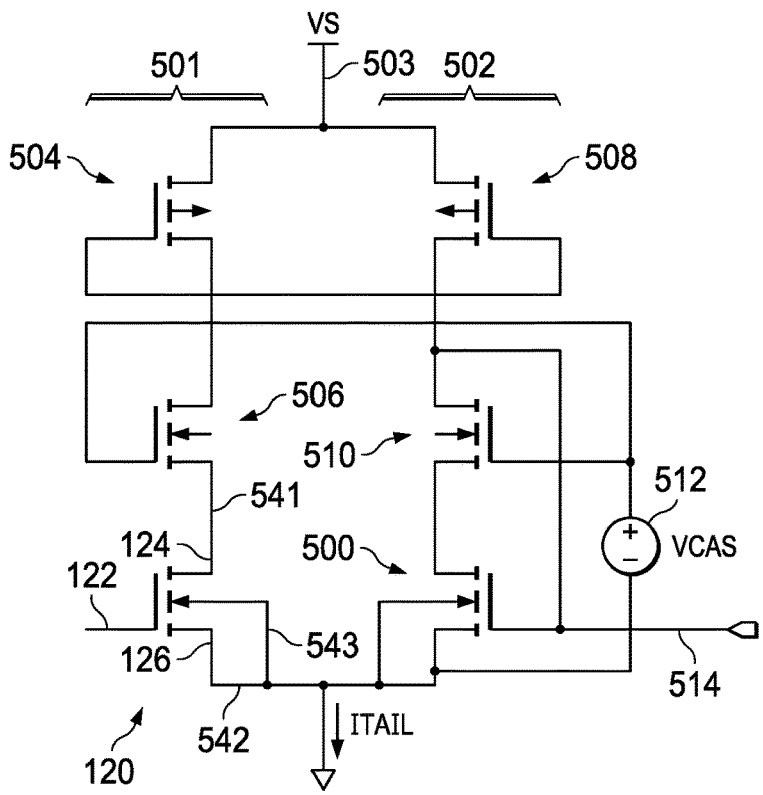
FIG. 5 is a schematic diagram of an example fluid potential sense circuit in the pH sensor of FIGS. 1 and 2.

FIG. 5 shows an example fluid potential sense circuit 540 that can be used as the fluid potential sense circuit 140 in the pH sensor 100 of FIGS. 1 and 2. This example provides a buffer circuit with constant channel charge to provide an output voltage signal that represents the voltage VG of the floating gate 122. The buffer circuit includes a first circuit branch 501 and a second circuit branch 502 that are coupled to a supply voltage terminal 503 having a supply voltage VS. The first circuit branch 501 includes a first current mirror transistor 504, in this example a p-channel FET, coupled in series with a first cascode transistor (e.g., an n-channel FET), and the sensing transistor 120 between the supply voltage terminal 503 and a tail current terminal. The second circuit branch 502 includes a second p-channel current mirror transistor 508 coupled in series between the supply voltage terminal 503 and the tail current terminal with a second cascode transistor 510 (e.g., n-channel FET), and a n-channel transistor 500 that is built to have matching dimensions in the semiconductor die as the sense transistor 120. The cascade voltage reference 512 provides a reference voltage VCAS to the gates of the cascode transistors 506 and 510. The fluid potential sense circuit 540 includes inputs 541, 542 and 543 that correspond to the respective inputs 141, 142 and 143 of the fluid potential sense circuit 140 in FIGS. 1 and 2 for interconnection to the drain 124, the source 126, and the body connection of the sense transistor 120. This example fluid potential sense circuit 540 mitigates capacitive coupling from the sensing amplifier back to the floating gate 122. In this example, changing the operating condition of the transistor 120 (e.g., drain current Id, drain-source voltage Vds) causes a change in the channel charge, which can be reflected in the floating gate and cause an error. The example buffer circuit 540 and FIG. 5 provides a generally constant drain current Id and a generally constant drain-source voltage Vds for the sense transistor 120, by operation as a differential amplifier with negative feedback. In this manner, the constant tail current ITAIL is substantially equally distributed between the floating gate sense transistor 120 and the reference transistor 500, giving a generally constant drain current Id through the sense transistor 120. The cascode transistors 506 and 510 operate to regulate the drain-source voltage Vds to a constant value across both transistors 120 and 500. The reference voltage source 512 sets the constant drain-source voltage Vds. The output of this circuit mirror transistors 504 and 508 set the floating gate voltage, and device parameter variations are fully or substantially cancelled with good matching to mitigate process, temperature, and voltage variations in manufacturing and operation of the sensor 100.

Figure 6:
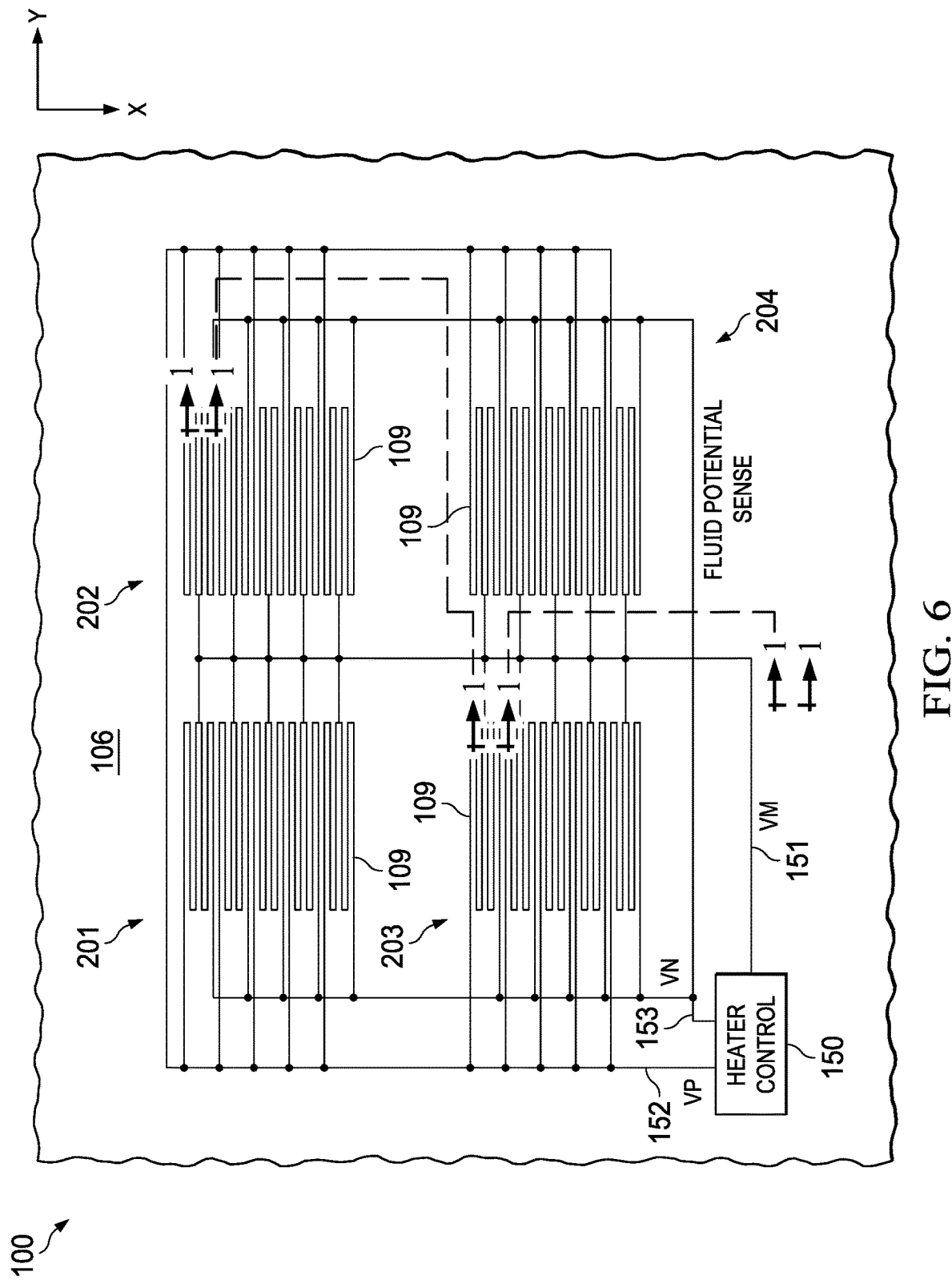
FIG. 6 is a top plan view of metal resistor structures in a first metallization level of the pH sensor of FIGS. 1 and 2.
Figure 7:
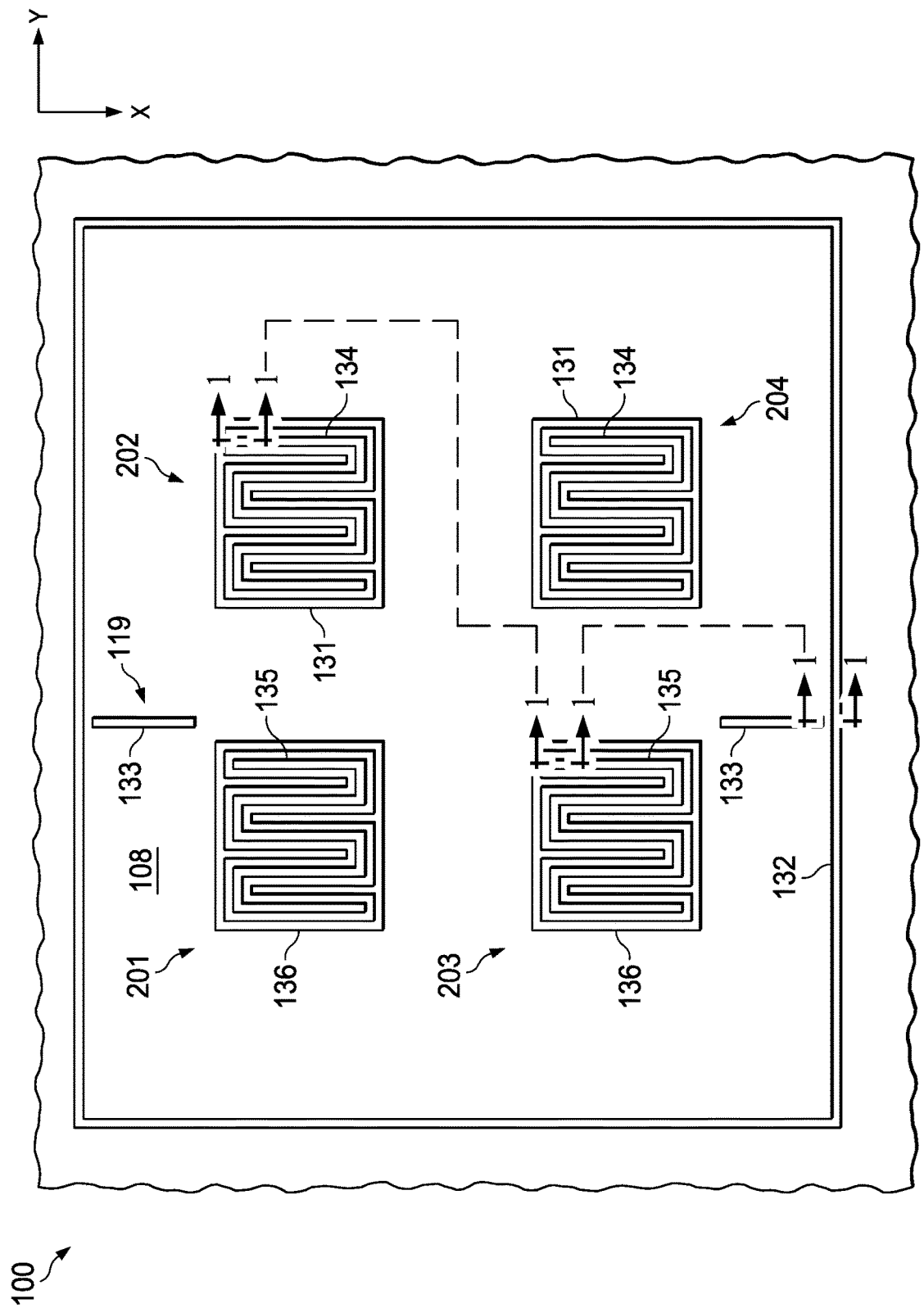
FIG. 7 is a top plan view of electrode structures in a second metallization level of the pH sensor of FIGS. 1 and 2.
Figure 8:
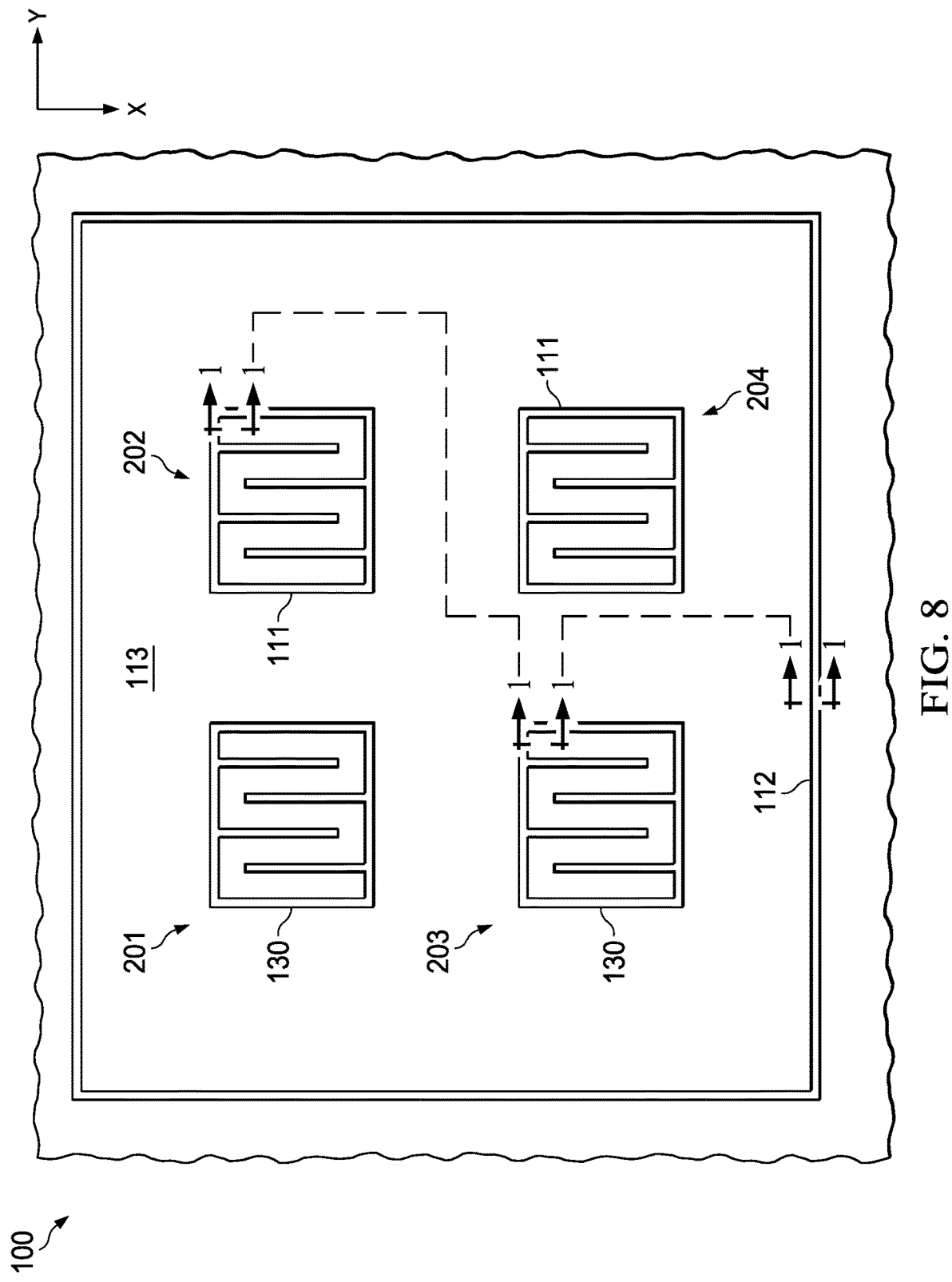
FIG. 8 is a top plan view of a sensing side and surfaces of certain electrodes exposed through respective openings in a dielectric layer in the pH sensor of FIGS. 1 and 2.

Referring to FIGS. 6-8, FIG. 6 shows a top view of the example structure of the metal resistor 154 of FIGS. 1 and 2 in the first metallization level 105 of the pH sensor 100 of FIGS. 1 and 2. FIG. 7 shows a top view of electrode structures 131, 132, 133, 134, 135 and 136 and the second metallization level 107 and FIG. 8 shows a top view of a sensing side and surfaces of certain electrodes exposed through respective openings in a dielectric layer in the pH sensor of FIGS. 1 and 2. In each of the example regions 201-204 in this example, the metal resistor 154 (FIG. 6) is constructed as a serpentine pattern of six turns of conductive metal (e.g., aluminum) patterned features 109 and the first metallization level 105. Each of these patterns has a first end coupled to the second output 152 of the heater circuit 150 having the voltage VP, a second and coupled to the third output 153 (having a voltage VN), and a center tap or middle connection coupled to the first output 151 having a middle voltage VM. The metal resistor 154 (e.g., FIG. 1) is positioned just below the platinum electrodes for heating, including just below the sensing area associated with the third electrode 133 and the sensing capacitor 138. In practice in one example, the fluid 114 (e.g., water) only needs to be heated near the sensing side 101 of the sensor 100, for example, within approximately 10 nm from the surface of the sensing area. Using a fine pitch for the spacing of the turns of the metal resistor 154 gives a more homogeneous heat distribution. The thermal conductivity of the platinum electrodes and the sensing area also facilitates homogeneous heat distribution. Finer pitch spacing between the turns of the serpentine patterns of conductive metal can be combined with splitting the heater into parallel heater segments to stay within a given supply voltage. The middle taps in one example facilitate low capacitive coupling into the floating node of the gate 122.

As discussed above in connection with FIG. 2, the example metal resistor 154 includes longitudinal sections having respective first and second ends and a tap between the first and second ends. The respective longitudinal sections extend along the second direction Y in the second level 107. The heater circuit 150 includes the first output 151 coupled to the taps of the respective longitudinal sections, the second output 152 coupled to the first ends of the respective longitudinal sections, and the third output 153 coupled to the second ends of the respective longitudinal sections. The second output 152 of the heater circuit 150 provides the first voltage signal (VP) that is positive relative to the voltage (VM) of the first output 151, and the third output 153 of the heater circuit 150 provides the second voltage signal (VN) that is negative relative to the voltage VM of the first output 151. This heater configuration mitigates the impact of the capacitive coupling of the metal resistor 154 and the floating gate 122 of the transistor 120.

In one implementation, the heater circuit 150 applies a positive voltage step at VH+ and a negative voltage step of the same size at VH– at the second and third outputs 152 and 153, respectively. Symmetrical voltage steps in this example are achieved by using the mid tap at the first output 151 and using pull-up and pull-down transistors at positive (VH+) and negative (VH–) pins. When the pull-up and pull-down transistors are turned off, the voltage of the coupling capacitors are determined by the mid voltage VM. When the pull-up and pull-down transistors are turned on in a symmetrical way, the mid node has to draw only the small amount of current caused by imperfections, and any such imperfections in the manufacturing of the semiconductor die have the same coupling capacitances for VH+ and VH–, for example by using the platinum electrode and metal resistor layout where the serpentine turn portions of the metal resistor 154 and the sensing area of the platinum electrodes are orthogonal with respect to one another. In this example, the turns of the metal resistor 154 extend generally along the Y direction, whereas the elongated portions of the serpentine sensing electrodes 134 and 135 extend along the X direction.

In this manner, the differences between the coupling capacitors of the positive branch and the negative branch are minimized by default. The impact of any asymmetries between the coupling capacitances can be cancelled by performing a second measurement with applying the positive voltage step at $V_{H-}$ and the negative voltage step at $V_{H+}$ and averaging the two results. The asymmetry cancellation holds even though the coupling is actually distributed.

Figure 9:
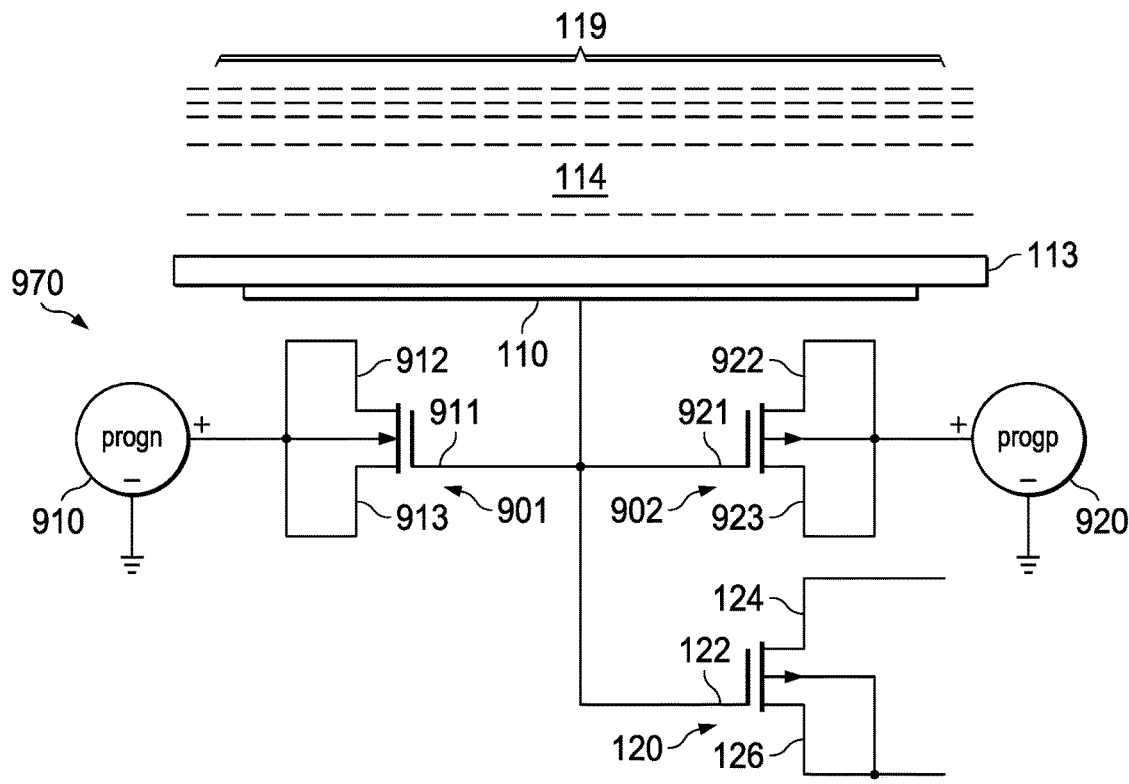
FIG. 9 is a schematic diagram of an example gate control circuit in the pH sensor of FIGS. 1 and 2.

FIG. 9 shows an example gate control circuit 970 that can be used as the gate control circuit 170 in the pH sensor of FIGS. 1 and 2 above. The gate control circuit 970 implements analog floating gate structures in the form of first and second control transistor 901 and 902 that set or adjust the floating gate voltage VG through tunneling affects in the thin gate oxide 121 (FIG. 1) of the sense transistor 120 in the semiconductor die. In this example, the controller 180 controls the gate control circuit 970 in order to set or adjust the gate voltage VG before or after sampling the output signal from the fluid potential sense circuit 140. The gate control circuit 970 in FIG. 9 includes a first control transistor 901, a second control transistor 902, a first voltage source 910, and a second voltage source 920. The first control transistor 901 has a first control gate 911, a first control drain 912, and a first control source 913. The first control gate 911 is coupled to the floating gate 122 of the floating gate transistor 120 as shown in FIG. 9, and the first control drain 912 is coupled to the first voltage source 910. The second control transistor 902 has a second control gate 921, a second control drain 922, and a second control source 923. The second control gate 921 is coupled to the gate 122, and the second control drain 922 is coupled to the second voltage source 920. The gate dielectric or gate oxide 121 in one example has a thickness of approximately 70 nm, and the semiconductor die includes the first and second control transistor 901 and 902 coupled as shown in FIG. 9 with the gates of the control transistors coupled to the floating gate 122. Tunneling affects add or subtract charge from the floating gate 122. In the illustrated example, a positive programming voltage progp of the voltage source 920 adds charge to the floating gate 122, whereas a negative programming voltage progn of the voltage source 910 subtracts charge from the floating gate 122. In one implementation, an expected stability of floating gate voltage VG is in the range of years range for and absolute value of the programming voltages of approximately 12 V.

Figure 10:
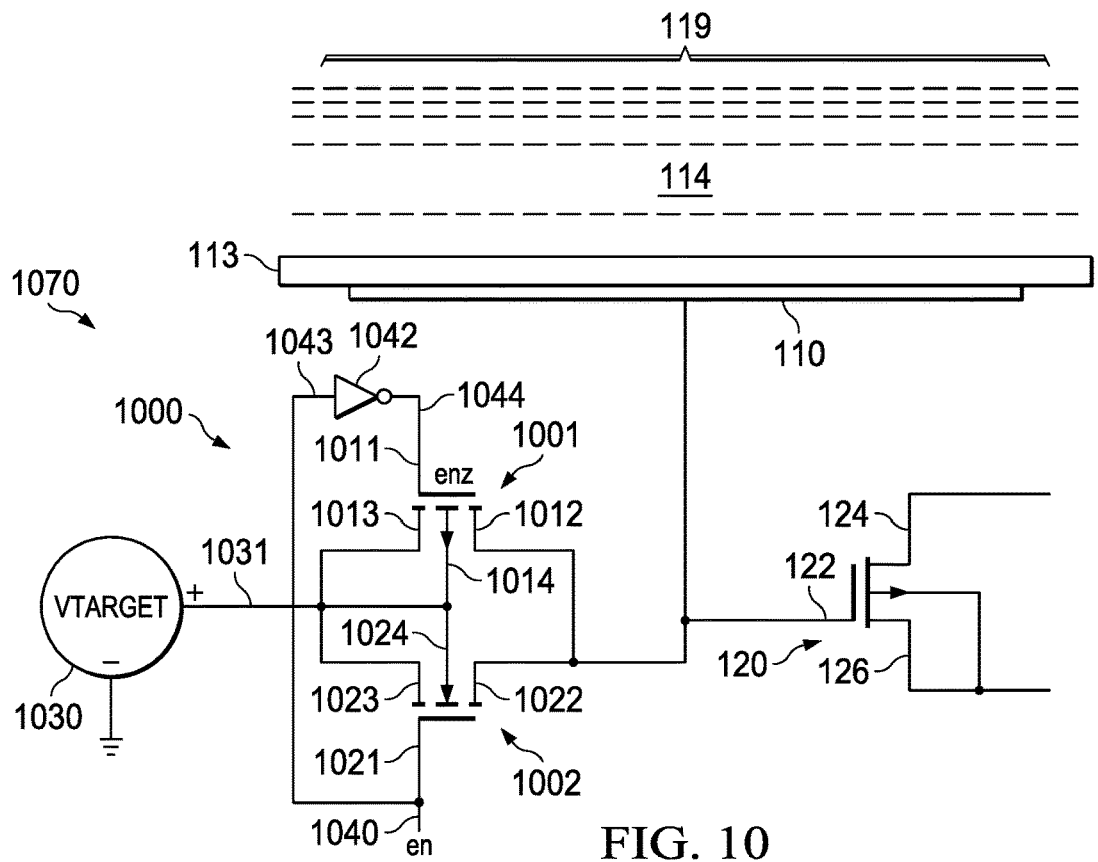
FIG. 10 is a schematic diagram of another example gate control circuit in the pH sensor of FIGS. 1 and 2.

FIG. 10 shows another example gate control circuit 1070 that can be used as the gate control circuit 170 in the pH sensor of FIGS. 1 and 2 above. This implementation uses a transfer gate 1000 to selectively couple the floating gate 122 to a voltage reference at a target voltage value to set or adjust the floating gate voltage VG. The transfer gate 1000 includes a p-channel transistor 1001 and a n-channel transistor 1002. The p-channel transistor 1001 has a first gate 1011, a first drain 1012, a first source 1013, and a first body connection 1014.

The n-channel transistor 1002 has a second gate 1021, a second drain 1022, a second source 1023, and a second body connection 1024. The second gate 1021 of the n-channel transistor 1002 is coupled to a control input 1040 that receives a control signal from the controller 180 has an active high state that turns the transistors 1001 and 1002 on, and a low state that turns the transistors 1001 and 1002 off. The first drain 1012 of the p-channel transistor 1001 is coupled to the gate 122, and the second drain 1022 of the n-channel transistor 1002 is coupled to the gate 122. The gate control circuit 1070 in this example also includes a voltage source 1030 with an output 1031 coupled to the first source 1013 of the p-channel transistor 1001, and to the second source 1023 of the n-channel transistor 1002. The circuit 1070 further includes an inverter 1042 with an input 1043 coupled to the control input 1040, and an output 1044 coupled to the second gate 1011 of the p-channel transistor 1001. When the transfer gate 1000 is turned on, the output 1031 of the voltage source 1030 is coupled to the floating gate 122 to set or adjust the floating gate voltage VG. During pH measurement cycles, the controller 180 turns the transfer gate 1000 off to disconnect the voltage source 1030 from the floating gate 122.

In the illustrated example, moreover, the back gates or body connections of the transistors 1001 and 1002 of the transfer gate 1000 are connected to the sources of the transistors 1001 and 1002. In the inactive state when the enable signal en=0, the back gate interconnection creates antiparallel diodes, which are configured to conduct when the floating gate voltage VG differs from the target voltage VTARGET. For the expected floating gate voltage variations for delta temperature measurements in the range of approximately +/−10 mV, the resulting diode current is smaller than the leakage current with back gates connected to supply and ground.

As discussed above in connection with FIG. 2, certain implementations include multiple sense transistors and associated fluid potential sense portions 119. This facilitates measurement of multiple sensors at the same time, for example, to reduce noise. In one example, the controller 180 obtains measurement samples signals from two fluid potential sense circuits 140 that are coupled to respective sense transistors of the sense portions 119. In one example, the controller 180 measures first sensor at temperature T1 and measures the second sensor at temperature T2 in one measurement cycle, and then measures the second sensor at temperature T1 and measures the first sensor at temperature T2 in the next measurement cycle, in order to mitigate or cancel noise and/or offset effects.

Disclosed examples provide no reference pH sensors 100 that are cost-effective and low complexity and operate at smaller signal levels than reference-based sensors. Described examples can implement fast sensing to collect extra data and hence take advantage of noise reduction techniques. In the example of FIGS. 1 and 2, the sense transistor 120 is laterally spaced from the metal resistor 154, and the temperature of the sense transistor 120 will not be strongly impacted by the heater temperature change. The use of first and second sense transistors 120 (e.g., multiple fluid potential sense portions 119 as shown in FIG. 2 above) allows the use of a matching reference transistor next to the sense transistor to help compensate for local temperature differences caused by heating, even if the sense transistors 120 are not laterally spaced far away from the metal resistor 154. In certain implementations, layout configuration and architecture can be used to ensure that heat at the sense electrode 133 is minimally coupled to the sense transistor.

In one implementation, the thermal impact can be mitigated by cooling the interconnection of the third electrode 133 to the floating gate 122, for example, by placing cool metals near the interconnecting conductive structures or by routing the conductive interconnection structures on polysilicon and/or on-field oxide of the semiconductor die outside of the heater regions, although lengthening the electrical interconnection can potentially increase parasitic interconnection capacitance. The illustrated examples include the metal resistor 154 in the second level 107 of the metallization structure. In other examples, the semiconductor die includes a multiple layer metallization structure, for example, with heater metal either at the PMD or polysilicon level, a first utilization level, a second metallization level, a third metallization level, etc., where the metal resistor 154 is preferably positioned proximate to and below the sense dielectric layer 113. In addition, the parasitic capacitance coupling between the metal resistor 154 and the sense electrode 133 is dependent on the space between the two layers, and the coupling can be increased by either thicker dielectric layer 108 or using multiple empty metal layers between the two layers.

In one example, the patterned electrode layer 110 is or includes platinum. In operation, the potential of a fluid is set by contact with one of more electrodes of the patterned electrode layer 110, and the exposed electrode or electrodes preferably are or include a non-reactive material with the fluid, for example, gold (Au), platinum (Pt), iridium (Ir), iridium oxide (IrOx), palladium (Pd), etc. The potential of the fluid 114 ideally is connected outside of the heater areas so that the voltage potential of the heating the sense electrode does not change. Multiple electrodes touching the fluid 114, for example, as shown in FIGS. 1, 2 and 8 above, enhances ESD resistance of the fluid 114. Certain implementations include an electrode positioned under the heater and next to the sense electrode 133 to facilitate improved ESD protection for the sensor 100. Such an additional electrode in one example is connected using an ESD cell so that for small voltages this electrode is floating but with a large voltage is connected to ground in order to protect the floating gate 122 from ESD events. In certain examples, the signal level for sensing pH is relatively small because the sensor is measuring differences for a relatively small temperature differences (e.g., 1° C. to 30° C.). For example, a 10° C. difference between T1 and T2 will generate approximately 5% signal per pH compared to that generated with a sensor that uses an external reference.

In one example for sensing the pH of a water fluid 114, the water has a built in potential next to the floating gate dielectric layer 113, which should be stable. The water touches the exposed portions of the platinum electrodes (e.g., services 111, 112 and 130 in FIG. 8 above), and the water potential is ideally stable. Contact between the water and the platinum generates a local potential between water and Pt. The water/Pt voltage drifts with time but is stable over short time periods (e.g., seconds to minutes range). Changing the Pt electrode potential will shift the water potential. The Pt electrode is also connected in certain implementations to an ESD circuit to protect the floating gate 122. Described examples facilitate pH measurements at different temperatures and can include separate temperature sensor and pH sensing areas with the same or similar layout (e.g., comb/serpentine as shown in FIG. 2 above) and with orthogonal metal resistor structures below these regions. Certain implementations provide separate temperature sensor and pH sensing areas or regions (e.g., temperature sense regions 202 and 204, fluid potential sense regions 201 and 203, and fluid potential sense portions 119 in FIG. 2 above) with different layouts (e.g. serpentine and square) and a heater below each. Certain implementations provide a combined pH sensing area and temperature sensor (e.g. parallel serpentine+comb). The use of controlled step signals applied to ends and centered taps of the metal resistor structure mitigates or prevents heater power from changing the floating gate voltage VG. In addition, described examples use orthogonal serpentine structures for heating and sensing (e.g., sensing both temperature and pH), and differential heater driving with center taps to mitigate capacitive coupling between the heating apparatus and the sensing electrodes. The comb structure of the electrodes 131 and 136 facilitates control of the sensed fluid potential in the vicinity of the sensing electrodes, for example, using comb structure interleaved with sensing serpentine structures and orthogonal heating structures. This allows control of the sensed fluid potential as well as facilitating ESD protection of the floating gate 122.

Certain examples use short heater pulses provided by the heater circuit 150, for example, in the millisecond range, to facilitate quick sensing in combination with temperature control. Certain implementations also employed multiple pH sensors measured at the same time, which can independently be heated, to facilitate immunity against common mode noise signals such as electrolyte potential, light, etc. The disclosed examples also allow substrate isolation at lower cost and much higher flexibility. In addition, the voltage capability of the isolation for a given design can be changed by layout (e.g., trench width) across the semiconductor and the backside isolation can be changed by varying the thickness of a polymer. The capacitance connection is less expensive for through wafer isolation compared to standard connection using special metal/dielectric stacks.

Modifications are possible in the described examples, and other implementations are possible, within the scope of the claims.

What is claimed is:

1. A sensor, comprising:
a semiconductor die having a sensing side, a semiconductor substrate, a metallization structure and a dielectric layer, the metallization structure including a first level on the semiconductor substrate and a second level between the first level and the sensing side, wherein the dielectric layer is between the sensing side and the second level;
a transistor having a gate, a drain and a source;
a first electrode in the second level, the first electrode having a first surface exposed to the sensing side through a first opening in the dielectric layer;
a second electrode in the second level, the second electrode spaced from the first electrode, and the second electrode having a second surface exposed to the sensing side through a second opening in the dielectric layer;
a third electrode in the second level, the third electrode spaced from the first and second electrodes, the third electrode coupled to the gate, and the third electrode separated by the dielectric layer from the sensing side; and
a heater circuit having an output coupled to the metallization structure, in which the heater circuit is configured to heat the sensing side via the metallization structure.

2. The sensor of claim 1, further comprising:
a fourth electrode in the second level, the fourth electrode spaced from the first, second and third electrodes, and the fourth electrode separated by the dielectric layer from the sensing side; and
a temperature sense circuit coupled to the fourth electrode.

3. The sensor of claim 2, wherein the first, second, third and fourth electrodes include platinum.

4. The sensor of claim 1, further comprising:
a fluid potential sense circuit having an input and an output, the input of the fluid potential sense circuit coupled to the transistor, and the fluid potential sense circuit configured to provide an output signal at the output of the fluid potential sense circuit; and
a controller having a controller input and a controller output, the controller input coupled to the output of the fluid potential sense circuit, and the controller configured to provide a pH signal at the controller output responsive to the output signal from the fluid potential sense circuit.

5. The sensor of claim 4, further comprising:
a gate control circuit having an output coupled to the gate, in which the gate control circuit is configured to provide an adjustment signal to the gate.

6. The sensor of claim 5, wherein:
the controller is coupled to the heater circuit; and
the controller is configured to:
in a first mode, control the heater circuit to refrain from heating the sensing side, and to receive a first sample of the output signal from the fluid potential sense circuit while the heater circuit refrains from heating the sensing side;
in a second mode, control the heater circuit to heat the sensing side, and to receive a second sample of the output signal from the fluid potential sense circuit while the heater circuit heats the sensing side; and
provide the pH signal based on the first and second samples of the output signal from the fluid potential sense circuit.

7. The sensor of claim 6, further comprising:
a fourth electrode in the second level, the fourth electrode spaced from the first, second and third electrodes, and the fourth electrode separated by the dielectric layer from the sensing side; and
a temperature sense circuit having: an input coupled to the fourth electrode; and a temperature sense output;
wherein the controller has a temperature sense input coupled to the temperature sense output, and the controller is configured to receive a temperature feedback signal from the temperature sense output in at least one of the first or second modes; and wherein the controller is: configured to control an amplitude or a timing of heating the sensing side based on the temperature feedback signal; or configured control a sampling of the output signal from the fluid potential sense circuit based on the temperature feedback signal; or configured to provide the pH signal based on the temperature feedback signal and based on the first and second samples of the output signal from the fluid potential sense circuit.

8. The sensor of claim 1, further comprising:
a gate control circuit having an output coupled to the gate, in which the gate control circuit is configured to provide an adjustment signal to the gate.

9. The sensor of claim 8, wherein the gate control circuit comprises:
a first control transistor having a first control gate, a first control drain and a first control source, the first control gate coupled to the gate, and the first control drain coupled to a first voltage source; and
a second control transistor having a second control gate, a second control drain and a second control source, the second control gate coupled to the gate, and the second control drain coupled to a second voltage source.

10. The sensor of claim 8, wherein the gate control circuit comprises:
a control input;
a transfer gate having a p-channel transistor and a n-channel transistor, in which: the p-channel transistor has a first gate, a first drain, a first source and a first body connection; the n-channel transistor has a second gate, a second drain, a second source and a second body connection; the second gate of the n-channel transistor is coupled to the control input; the first drain of the p-channel transistor is coupled to the gate; and the second drain of the n-channel transistor is coupled to the gate;
a voltage source having an output, the output of the voltage source coupled to: the first source of the p-channel transistor; and the second source of the n-channel transistor; and
an inverter having: an input coupled to the control input; and an output coupled to the first gate of the p-channel transistor.

11. The sensor of claim 1, further comprising:
a fourth electrode in the second level, the fourth electrode spaced from the first, second and third electrodes, and the fourth electrode separated by the dielectric layer from the sensing side;
a temperature sense circuit coupled to the fourth electrode;
a fifth electrode in the second level, the fifth electrode spaced from the first, second and fourth electrodes, the fifth electrode separated by the dielectric layer from the sensing side, and the fifth electrode coupled to the third electrode; and
a sixth electrode in the second level, the sixth electrode spaced from the first, second, third, fourth and fifth electrodes, and the sixth electrode having a third surface exposed to the sensing side through a third opening in the dielectric layer;
the fourth and fifth electrodes having serpentine shapes with elongated sections extending along a first direction in the second level;
the first electrode laterally surrounding the fourth electrode in the second level;
the first electrode having inwardly extending branch portions extending along the first direction between adjacent ones of the elongated sections of the fourth electrode;
the sixth electrode laterally surrounding the fifth electrode in the second level; and
the sixth electrode having inwardly extending branch portions extending along the first direction between adjacent ones of the elongated sections of the first electrode.

12. The sensor of claim 11, wherein:
the first and fourth electrodes are in a first region in the second level;
the fifth and sixth electrodes are in a second region in the second level, the second region spaced from the first region; and
the second electrode laterally surrounds the first and second regions.

13. The sensor of claim 11, wherein:
the metallization structure includes a metal resistor;
the metal resistor includes longitudinal sections;
each longitudinal section has a respective first end, a respective second end and a respective tap between the first and second ends;
the longitudinal sections extend along a second direction in the second level, and the second direction is orthogonal to the first direction; and
the heater circuit includes: a first output coupled to the respective taps of the longitudinal sections; a second output coupled to the respective first ends of the longitudinal sections; and a third output coupled to the respective second ends of the longitudinal sections; and the heater circuit is configured to provide:
at the second output of the heater circuit, a first voltage signal that is positive relative to a voltage at the first output of the heater circuit; and
at the third output of the heater circuit, a second voltage signal that is negative relative to the voltage at the first output of the heater circuit.

14. A sensor, comprising:
a semiconductor die having a sensing side, a semiconductor substrate, a metallization structure and a dielectric layer, the metallization structure including: a first electrode having a first surface exposed to the sensing side through a first opening in the dielectric layer; a second electrode having a second surface exposed to the sensing side through a second opening in the dielectric layer, the second electrode spaced from the first electrode; and a third electrode spaced from the first and second electrodes and separated by the dielectric layer from the sensing side;
a transistor in the semiconductor die, the transistor having a gate, a drain and a source, the gate coupled to the third electrode;
a heater circuit configured to heat the sensing side;
a fluid potential sense circuit in the semiconductor die, the fluid potential sense circuit coupled to the transistor and the fluid potential sense circuit configured to provide a fluid potential output signal; and
a controller in the semiconductor die, the controller coupled to the heater circuit, and the controller configured to:
control the heater circuit to heat the sensing side at a first temperature;
receive a first sample of the fluid potential output signal from the fluid potential sense circuit while the heater circuit heats the sensing side at the first temperature;

control the heater circuit to heat the sensing side at a second temperature that is different than the first temperature;

receive a second sample of the fluid potential output signal from the fluid potential sense circuit while the heater circuit heats the sensing side at the second temperature; and provide a pH signal based on: the first and second samples; the first temperature; and the second temperature.

15. The sensor of claim 14, further comprising:

a fourth electrode in the metallization structure, the fourth electrode spaced from the first, second and third electrodes, and the fourth electrode separated by the dielectric layer from the sensing side; and a temperature sense circuit coupled to the fourth electrode;

wherein the controller is coupled to the temperature sense circuit, and the controller is configured to verify or control a temperature at which the heater circuit heats the sensing side, based on a temperature feedback signal from the temperature sense circuit.

16. The sensor of claim 15, further comprising:

a gate control circuit having an output coupled to the gate, in which the gate control circuit is configured to adjust a signal at the gate responsive to a control signal from the controller;

wherein the controller is coupled to the gate control circuit, and the controller is configured to provide the control signal to the gate control circuit before or after the controller receives the first sample or the second sample of the fluid potential output signal from the fluid potential sense circuit.

17. The sensor of claim 14, further comprising:

a gate control circuit having an output coupled to the gate, in which the gate control circuit is configured to adjust a signal at the gate responsive to a control signal from the controller;

wherein the controller is coupled to the gate control circuit, and the controller is configured to provide the control signal to the gate control circuit before or after the controller receives the first sample or the second sample of the fluid potential output signal from the fluid potential sense circuit.

* * * * *